United States Patent [19]
Uda et al.

[11] Patent Number: 5,197,082
[45] Date of Patent: Mar. 23, 1993

[54] DIGITAL SIGNAL REGENERATOR

[75] Inventors: Yoshihiro Uda; Nobuaki Takahashi, both of Tokyo, Japan

[73] Assignee: NEC Corporation, Japan

[21] Appl. No.: 349,641

[22] Filed: May 10, 1989

[30] Foreign Application Priority Data

May 10, 1988 [JP] Japan .................................. 63-112785

[51] Int. Cl.$^5$ .......................................... H04L 25/20
[52] U.S. Cl. ........................................ 375/4; 328/164; 375/106
[58] Field of Search .................. 375/4, 106, 110, 111, 375/113; 328/138, 164; 307/522

[56] References Cited

U.S. PATENT DOCUMENTS

| | | | |
|---|---|---|---|
| 3,737,585 | 6/1973 | Ghosh ..................................... | 375/4 |
| 3,962,635 | 6/1976 | Roza ....................................... | 375/4 |
| 3,983,498 | 9/1976 | Malek ..................................... | 375/110 |
| 4,078,157 | 3/1978 | Lender et al. ......................... | 375/4 |
| 4,320,515 | 3/1982 | Burton, Jr. ............................. | 375/4 |
| 4,700,357 | 10/1987 | Ast ......................................... | 375/4 |
| 4,737,970 | 4/1988 | Viola et al. ........................... | 375/106 |

FOREIGN PATENT DOCUMENTS 56-71350 6/1981 Japan .
2176376 5/1986 United Kingdom .

OTHER PUBLICATIONS

IEEE International Conference on Communications, ICC'82, Jun. 13-17, 1982; vol. 1 of 3; IEEE New York US; pp. 2E.6.1-2E.6.5; R. Clewer; "Design Considerations for Intelsat V TDMA Modems".

R. L. Rosenberg et al., "Optical Fiber Repeatered Transmission Systems Utilizing SAW Filters", IEEE Transactions on Sonics and Ultrasonics, vol. 30; No. 3 (May 1983), pp. 119-126.

*Primary Examiner*—Benedict V. Safourek
*Attorney, Agent, or Firm*—Ostrolenk, Faber, Gerb & Soffen

[57] ABSTRACT

Disclosed is a digital signal regenerator responsive to a data bit stream having a predetermined bit rate for generating a retimed data bit stream. The digital signal regenerator includes a transition detect and pulse generating circuit responsive to the data bit stream for detecting transition positions between two different states of the data bit stream and for generating respective width-variable pulses at the transition positions. Filtering circuitry responsive to the width-variable pulses is provided for extracting a timing wave from the data bit stream. A clock-pulse generating circuit responsive to the timing wave is provided for generating a clock pulse sequence. A discriminating circuit responsive to the clock pulse sequence is lastly provided for discriminating between levels "1" and "0" of the data bit sequence to generate the retimed data bit stream.

5 Claims, 3 Drawing Sheets

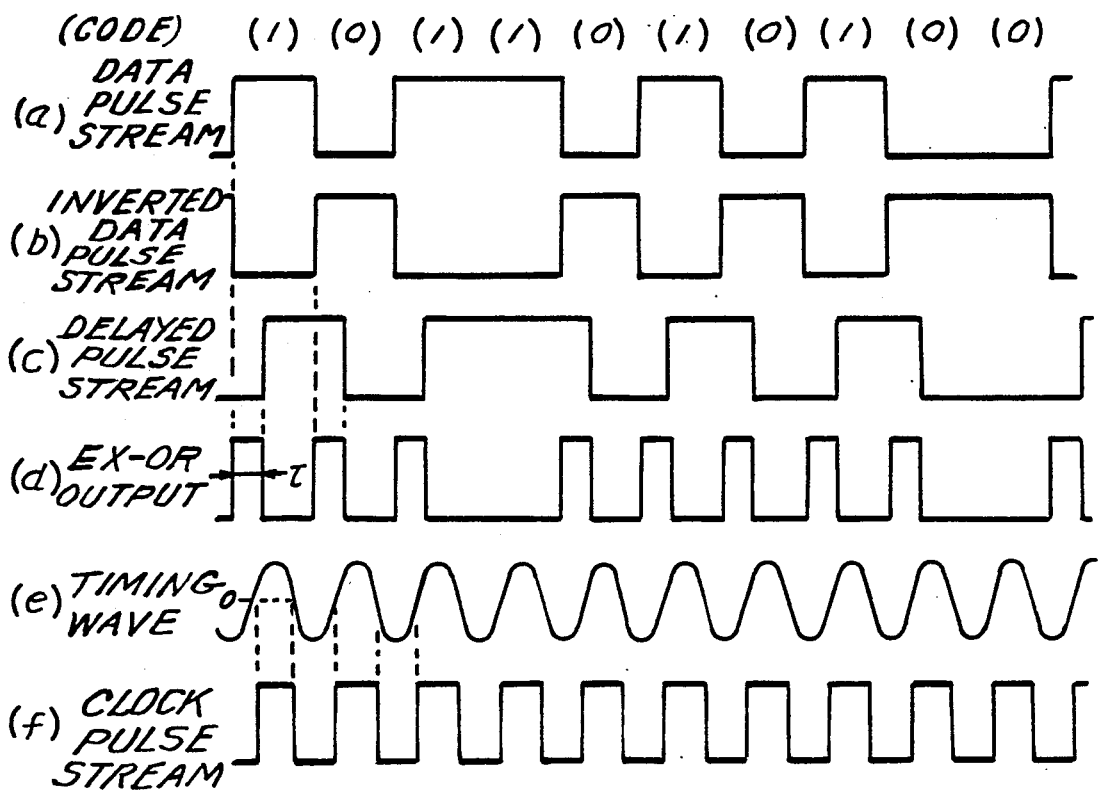
FIG_3.
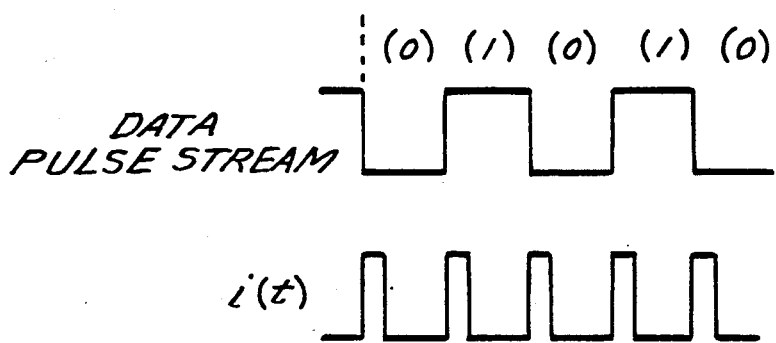
FIG_4.

DIGITAL SIGNAL REGENERATOR

BACKGROUND OF THE INVENTION

This invention relates to a digital signal regenerator which regenerates a high-bit-rate digital signal received from a transmission line, and more particularly to a regenerator having an improved timing recovery circuit that extracts a timing wave from the received signal.

Fiber optic digital transmission systems have tremendous capacity to transmit large amounts of information over a single optical fiber and provide a very high bit rate digital transmission. However, as the bit rate increases, an improved timing recovery technique is required for accurate regeneration of the transmitted digital data.

As a prior art regenerator, Robert L. Rosenberg et al. disclose a regenerator which is applicable at bit rates of 100 to 1000 Mbit/s and more in a paper entitled "Optical Fiber Repeatered Transmission Systems Utilizing SAW Filters" in IEEE Transactions on Sonics and Ultrasonics, Vol. 30, No. 3, pp. 119-126, May, 1983.

FIG. 1 is a partial reproduction of the Rosenberg et al. regenerator which receives a high bit rate data pulse stream, equalizes it with an equalizer 100, recovers a clock pulse stream with a timing recovery circuit 200, and regenerates the transmittal pulse stream with a decision circuit 300 gated by the clock pulse stream. The timing recovery circuit 200 differentiates the received data pulse stream from the equalizer 100 with a prefilter 201 having differential characteristics to provide the transition points of the pulse stream. The differentiated pulse stream undergoes full-wave rectification with a rectifier 202, and the rectified pulse stream is fed to a filter 203 (an SAW filter, for instance) which has bandpass characteristics and extracts a timing wave whose frequency is twice the transmitted data bit rate when the transmitted data pulse stream has an NRZ (Non-Return to zero) format. The timing wave is transformed into a square wave (timing clock stream) by a limit amplifier 204, and the phase of the timing clock stream is adjusted by a phase adjuster 205, and then supplied to the decision circuit 300 and other processing circuits. The decision circuit 300 comprises a simple digital circuit such as a D-type flip-flop, which samples the received data pulse stream coming from the equalizer 100 at the rise (or fall) of the pulses of the timing clock sequence from the phase adjuster 205, and regenerates the data pulse stream as a stream of well-shaped electrical data pulses having nearly constant amplitude and consistent timing of transitions. The phase adjuster performs a timing adjustment of the rise (or fall) positions of the clock pulses so that the clock pulse sequence drives the D-type flip-flop at center-positions in-time of individual received data pulses. The adjustment is requisite to control the decision errors that are otherwise caused by phase jitter contained in the received data pulse stream. These errors are generally likely to appear when the rise (or fall) positions in time of the received data pulse stream lie close to those of the clock pulses.

Assuming a bit rate of 100 Mbit/s, the phase adjustment that is necessary to shift over a period of the data pulse is just 10 nsec at maximum. However, the phase adjuster involves a degradation of several nsec in the rise (or fall) of the timing clock due to the effect of bandwidth limitation; thus, the permissible time range for sampling the received data bit stream is limited to several nano-seconds only. This time limitation leaves no margin long enough to adjust the timing of a clock to be applied to the decision circuit, resulting in decision errors. Moreover, when degraded timing pulses having a long rise or fall time drive the D-type flip-flop, the phase relation between the received data pulse stream and the clock pulse stream inconveniently varies, rendering adjustment of phase relation extremely difficult.

SUMMARY OF THE INVENTION

An object of this invention is to provide a regenerator that can produce a regenerated data pulse stream with reduced decision errors.

Another object of the invention is to provide a regenerator that permits the use of a phase-adjustable clock pulse sequence without deterioration in rise and fall characteristics of recovered clock pulses.

Yet another object of the invention is to provide a regenerator that is adaptable to a high bit rate data pulse stream.

In a preferred form, the regenerator according to this invention receives a data bit stream having a predetermined bit rate for generating a retimed data bit stream. The regenerator comprises transition-detect and pulse generating means responsive to the data bit stream for detecting transition positions between two different states of the data bit stream and for generating width-variable pulses at the transition positions; filtering means responsive to the width-variable pulses for extracting a timing wave of the data bit stream; clock pulse generating means responsive to the timing wave for generating a clock pulse sequence; and discriminating means responsive to the clock pulse sequence for discriminating the levels "1" and "0" of the data bit sequence to generate the retimed data bit stream.

BRIEF DESCRIPTION OF THE DRAWINGS

The present invention will be better understood from the following detailed description taken in conjunction with the accompanying drawings, in which:

FIGS. 3 and 4 are waveform charts for illustrating the operation of the embodiment of FIG. 2.

DETAILED DESCRIPTION OF THE PREFERRED EMBODIMENT

Figure 1:
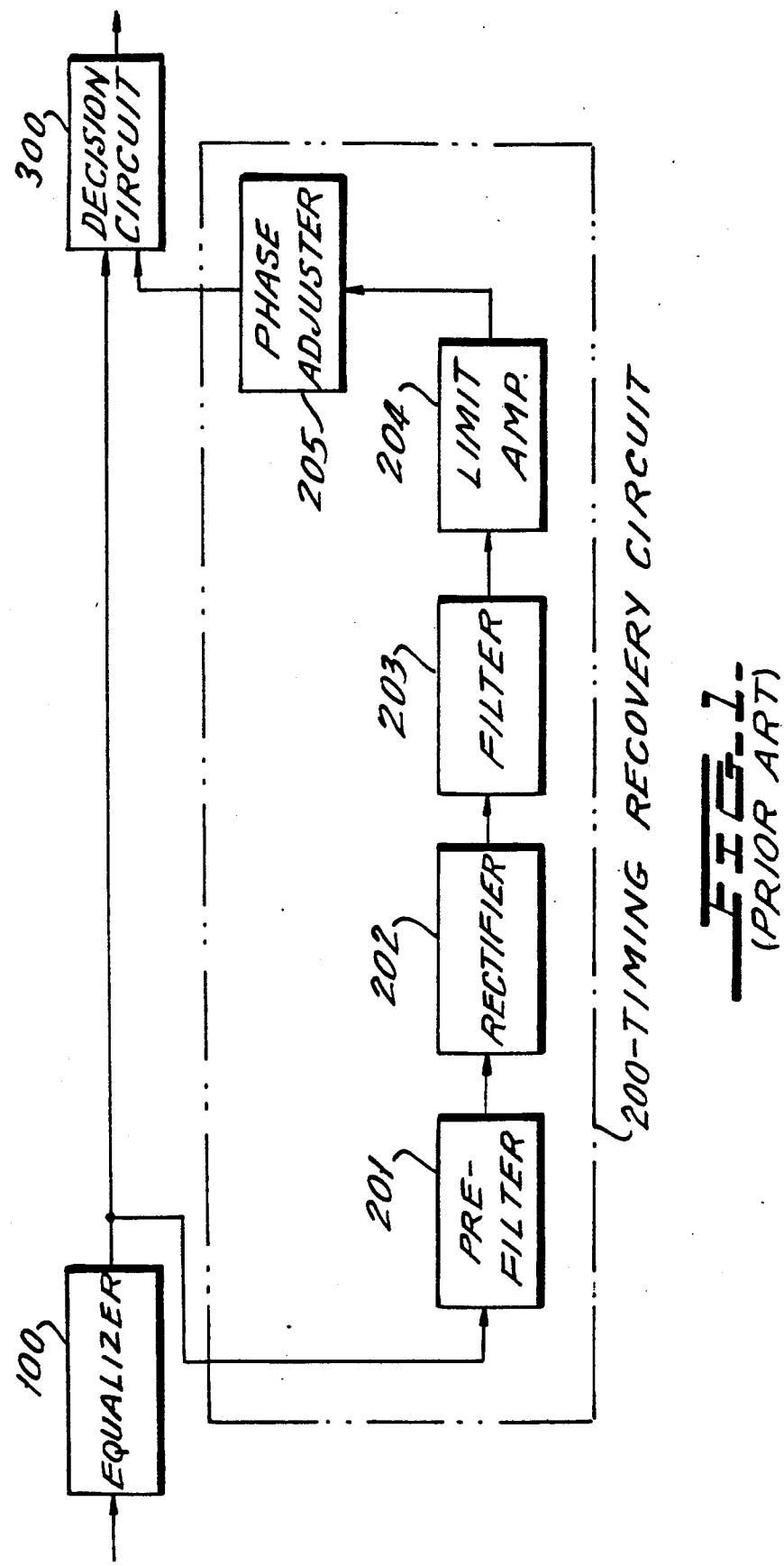
FIG. 1 is a block diagram showing a prior art digital signal regenerator.
Figure 2:
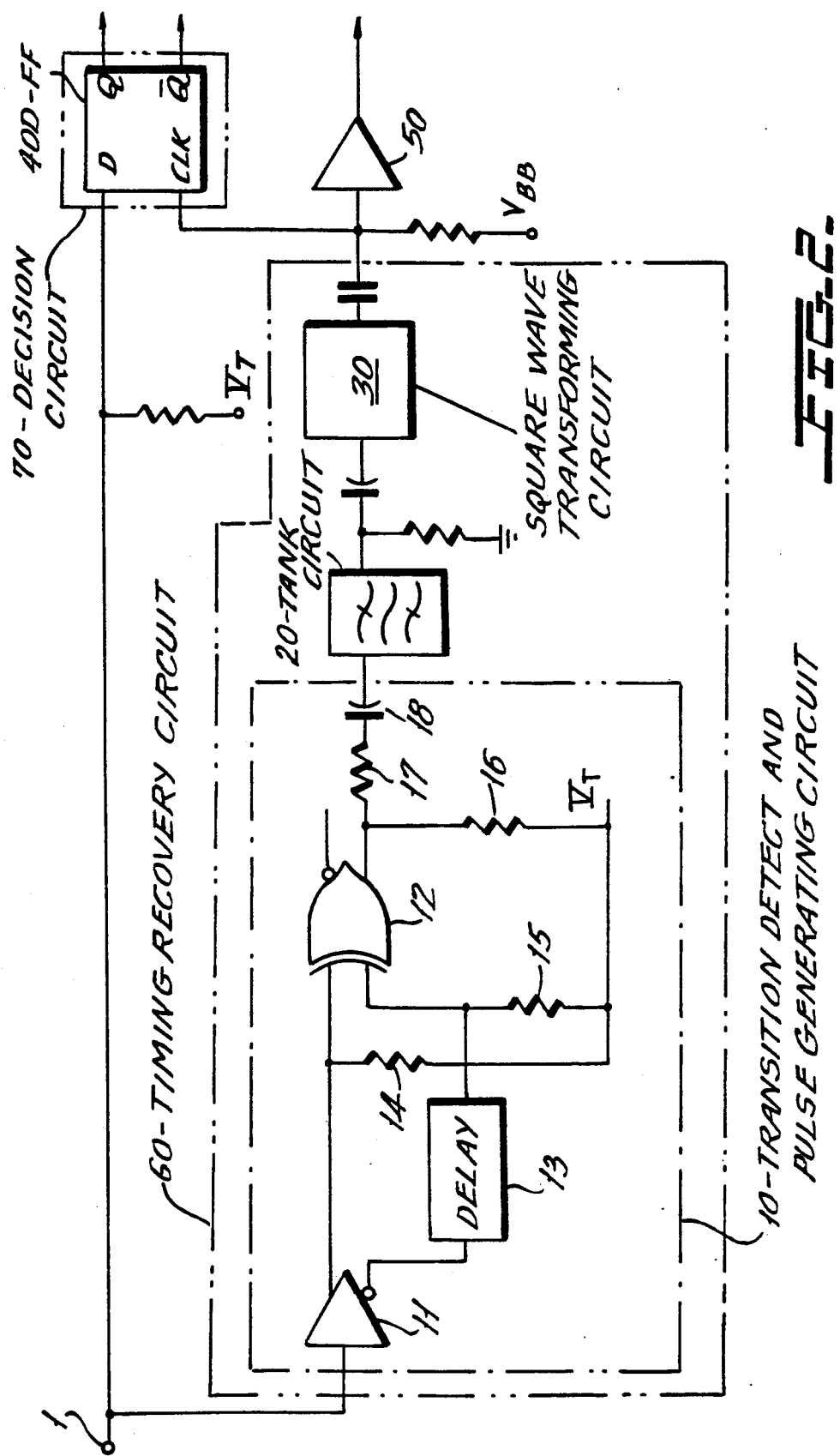
FIG. 2 is a block diagram showing an embodiment of this invention.

In FIG. 2, a digital signal regenerator of the present invention comprises a timing recovery circuit 60 and a decision circuit 70. The timing recovery circuit comprises a transition detect and pulse generating circuit 10 which detects the transition points between "1" (high) and "0" (low) of data bits of a received data pulse stream from the transmission line and generates a width-variable pulse at the detected position; a tank circuit 20 which extracts a timing wave of the data pulse stream from the circuit 10; and a square wave transforming circuit 30 which outputs a timing clock synchronous with the timing wave. The decision circuit comprises a D-type flip-flop 40.

In the regenerator shown in FIG. 2, the transition detect and pulse generating circuit 10 is connected to the input side of the tank circuit, and omits a phase adjuster as used in the prior art connected between the clock input of the D-type flip-flop 40 and the square-wave transforming circuit 20. An input terminal 1 is assumed to accept a data pulse stream of 100 Mbit/s which are encoded in NRZ (non-return to zero) format. The received data pulse stream is fed into the transition detect and pulse generating circuit 10 and the data input terminal of D-type flip-flop 40.

An input buffer amplifier 11 supplies a non-inverted version of the received data pulse stream ((a) in FIG. 3) to one of the input terminals of an exclusive OR gate (EX-OR) 12 and an inverted version ((b) in FIG. 3) to a variable delay circuit 13. Responsive to the output of the buffer amplifier 11 and a delayed pulse stream ((c) in FIG. 3) from the delay circuit 13, the EX-OR gate 12 generates a stream of pulses of the variable width $\tau$ ((d) in FIG. 3) which is determined by the variable delay time $\tau$ of the delay circuit 13. The pulse stream ((d)) from the EX-OR gate 12 is supplied to the tank circuit 20 via a resistor 17 and a capacitor 18. Resistors 14, 15, and 16 are termination resistors and are connected to a termination voltage source ($V_T$) at one terminal thereof.

The tank circuit 20 is a bandpass filter which has a center frequency of 100 MHz in passband, and extracts a timing wave of the received data pulse stream out of the output signal of the EX-OR gate. The transforming circuit 30 amplifies the timing wave of 100 MHz and transforms it into a clock pulse stream ((f) in FIG. 3) in synchrony with the timing wave. The clock pulse stream is fed to the clock input terminal of the D-type flip-flop 40 and to a buffer 50, and is then outputted from the buffer 50 to other processing circuits (not shown).

The phase of the output signal from the tank circuit 20 can be changed in proportion to the pulse width $\tau$ of the pulses generated from the EX-OR gate 12. By way of example, assume the received data pulse stream alternately repeats "1" and "0" pulses in NRZ format as shown in FIG. 4. The EX-OR gate 12 outputs a stream i(t) of pulses having the width $\tau$ and period $T_l$. The periodic pulse stream i(t) is expanded in Fourier series as follows:

$$i(t) = \tau/T_1 - (1/n\pi) \cdot \sum_{n=1}^{\infty} \{\cos(2\pi n\tau/T_1) \cdot \sin(2\pi nt/T_1) - \sin(2\pi nt/T_1) - \sin(2\pi n\tau/T_1) \cdot \cos(2\pi nt/T_1)\}$$

The expression can be transformed further as below:

$$i(t) = \tau/T_1 - (1/n\pi) \cdot \sum_{n=1}^{\infty} [2 \cdot \sin(-\pi n\tau) \cdot \cos\{(2\pi n/T_1) \cdot (t - \tau/2)\}]$$

This equation indicates that each frequency component becomes delayed by $\tau/2$ in responsive to the pulse width $\tau$. As the tank circuit 20 extracts the fundamental frequency component of the pulse stream i(t), the phase of the timing wave from the tank circuit 20 can be delayed by $\tau/2$ in proportion to the pulse width $\tau$.

According, the timing of a clock pulse stream produced in the square wave transforming circuit 30 can be set by adjusting the pulse width $\tau$ which is determined by the delay $\tau$ of the delay circuit 13. Thus, the clock pulses can be fed directly to the D-type flip-flop 40 without passing through a phase adjuster which limits passband once the clock pulses are recovered. Such clock pulses drive the flip-flop and sample the received data pulse stream with appropriate timing to produce a regenerated data pulse stream. Thus, the present invention provides stable and accurate timing discrimination in the regenerator.

In FIG. 2, the delay circuit 13 may be any of a gate logic IC, coaxial cables, or strip lines, while the square-wave transforming circuit 30 may be a limiting amplifier, a comparator or another high-speed analog circuit.

The data pulse stream is not limited to a NRZ format but may be of another format such as a CMI (coded-mark inversion) format. However, unlike an NRZ format, a CMI format includes a code of two bits per one time slot. Therefore, when a CMI signal is received, the tank circuit 20 extracts a timing wave of a frequency twice as high as that obtained from NRZ signal so as to allow detection of the "1" or "0" status within one time slot.

As described in detail in the foregoing statement, this invention can effectively adjust the discriminating timing of "1" and "0" of a received data pulse stream by simply changing the width of the pulses generating at the transition point of the received data pulse stream and extracting timing waves.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A digital signal regenerator responsive to a data bit stream having a predetermined bit rate for generating a retimed data bit stream, the digital signal regenerator comprising:
    transition detect and pulse generating means responsive to the data bit stream for detecting transition positions between two different states of the data bit stream and for generating respective width-variable pulses at the transition position;
    filtering means responsive to a sequence of said width variable pulses for extracting a timing wave from the data bit stream whose phase changes in response to the width of said width-variable pulses;
    clock-pulse generating means responsive to the timing wave for generating a clock pulse sequence; and
    discriminating means responsive to the clock pulse sequence for discriminating between levels "1" and "0" of the data bit sequence to generate the retimed data bit stream;
    wherein an appropriate pulse width of said width-variable pulse is set by said transition detect and pulse generating means so that said discriminating means can discriminate between said levels at an appropriate timing.

2. The digital signal regenerator as claimed in claim 1, further comprising means for adjusting the timing of the clock pulse sequence to optimize the width of the width-variable pulses.

3. The digital signal regenerator as claimed in claim 1, wherein said digital signal regenerator is responsive to a data bit stream which has been encoded into a non-return-to zero format.

4. The digital signal regenerator as claimed in claim 1, further comprising means for coupling the clock pulse sequence from the clock pulse generating means to said discriminating means without substantial phase adjustment.

5. A digital signal regenerator responsive to a data bit stream having a predetermined bit rate for generating a retimed data bit stream, the digital signal regenerator comprising:

transition detect and pulse generating means responsive to the data bit stream for detecting transition positions between two different states of the data bit stream and for generating respective width-variable pulses at the transition positions;

filtering means responsive to a sequence of said width-variable pulses for extracting a timing wave from the data bit stream whose phase changes in response to the width of said width variable pulses;

clock pulse generating means responsive to the timing wave for generating a clock pulse sequence; and discriminating means responsive to the clock pulse sequence for discriminating between levels "1" and "0" of the data bit sequence to generate the retimed data bit stream;

and further wherein the transition detect and pulse generating means comprises inverting means for inverting the data bit stream to produce an inverted data bit stream, variable delay means for delaying the inverted data bit stream to generate a variably delayed data bit stream, and an exclusive-OR circuit means responsive to the data bit stream and the variably delayed data bit stream for generating the width-variable pulses.

* * * * *